Sept. 12, 1950      J. I. HAASE      2,522,264
CONTROL APPARATUS
Filed May 23, 1947
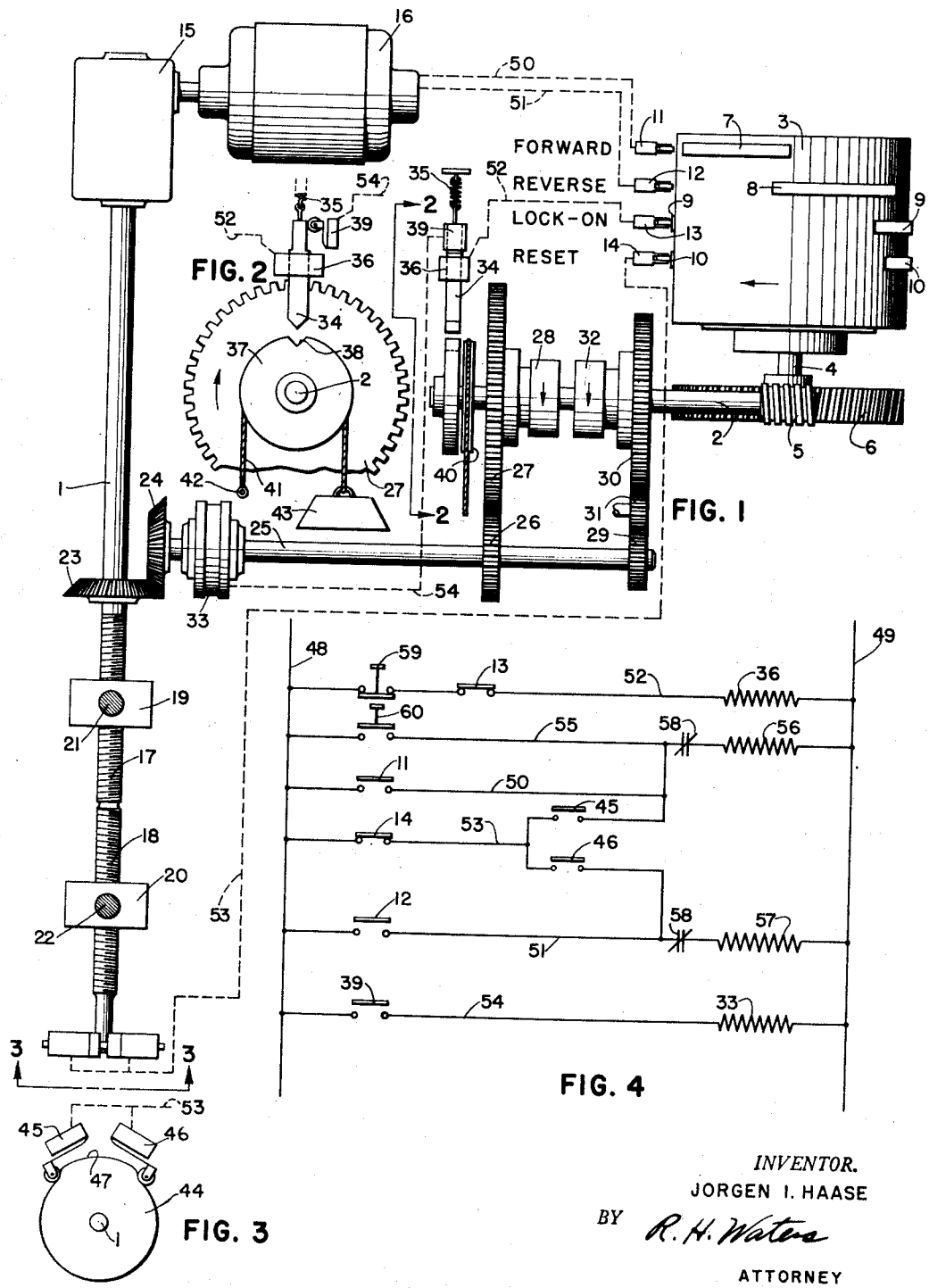
INVENTOR.
JORGEN I. HAASE
BY R. H. Waters
ATTORNEY Patented Sept. 12, 1950

2,522,264

UNITED STATES PATENT OFFICE 2,522,264

CONTROL APPARATUS

Jorgen I. Haase, Akron, Ohio, assignor to Wingfoot Corporation, Akron, Ohio, a corporation of Delaware Application May 23, 1947, Serial No. 749,976

12 Claims. (Cl. 318—162)

1

The present invention relates to a driving means for actuating an element or series of elements through predetermined cycles and the principal object of the invention is to insure that each cycle of operation does not vary (within certain tolerances) from any other cycle.

The present application of the invention is in connection with the stitchers of a tire-building machine which is taken merely by way of example and not as limiting the invention. These stitchers move back and forth along a predetermined path constituting a cycle. It is very important that, at the start of each cycle, the stitchers are always in the same initial position or very close to that position. Ordinarily, however, these stitchers are driven by a motor which moves them in a forward and then a reverse direction. Unless the motor or other driving means starts and stops at exactly the same position every time, a cumulative error creeps into the mechanism and eventually, instead of having the stitching mechanism start in the position intended, it will start at a position somewhat removed from the intended position, thus effecting an improper cycle.

In order to avoid the above undesirable results, this invention contemplates that, at the end of each cycle of operation, the stitchers be relocated at the initial point of the cycle. An important object of this invention therefore is to provide resetting mechanism for locating the stitchers in the aforesaid position at the end of each cycle to prevent an accumulation of error.

Another object of this invention is to drive operational members in a forward and reverse direction while maintaining a unidirectional movement of the control for the operational members. In the present application, a control drum is employed.

Other objects of this invention will appear as the description thereof proceeds, the novel features, arrangements and combinations being clearly set forth in the specification and in the claims thereunto appended.

In the drawings:

Fig. 1 is a diagrammatic plan view illustrating one application of my invention;

Fig. 2 is an end elevation of a portion of the apparatus shown in Fig. 1 and looking in the direction 2—2 in Fig. 1;

Fig. 3 is an end elevation of a portion of the apparatus shown in Fig. 1 and looking in the direction 3—3 in Fig. 1; and Fig. 4 is a wiring diagram of the electrical control for the apparatus.

2

With particular reference to Fig. 1, the reference character 1 represents an operational shaft and 2 the control shaft which operates the control drum 3 mounted on a shaft 4 driven from the stub shaft 2 by a worm 5 and worm wheel 6. Any suitable gear reduction means can be used to drive the shaft 4 at a relatively low speed with respect to that of the shaft 2. The control drum 3 carries on the outer surface thereof a series of cams 7, 8, 9 and 10, to be described hereinafter with reference to the operation of the mechanism. These cams operate respectively the microswitches 11, 12, 13 and 14 in a manner to be described later. A duplicate set of cams are on the other side of the drum (cams 9 and 10 showing at the left). The control drum 3 is geared to the operational shaft in such a manner that it makes one complete revolution or one of equal divisions thereof for each cycle of the operational shaft. In the particular embodiment shown herein, the drum makes ½ revolution for each cycle of shaft 1.

The control drum turns in the direction of the arrow and at a speed directly proportional to that of the control shaft, thereby providing a direct measurement of the position and behavior of shaft 1 at any point in its cycle. Not only will this enable the single control drum to institute successive cycles without reversal but also during the rotation of the drum additional operations may be brought into operation and controlled by the control drum.

The operational shaft 1 is driven through speed-reduction gearing 15 by a motor 16 which is a reversible motor and preferably one that can be run at different speeds for a purpose which will be described hereinafter. The operational shaft is provided with oppositely threaded portions 17 and 18 carrying the nuts 19 and 20, respectively, on which are mounted posts 21 and 22 which in turn carry the stitcher mechanisms (not shown). As the motor 16 rotates the shaft 1 first in one direction and then in the opposite direction, the posts 21 and 22 move toward and away from each other to carry the stitchers across the surface of the tire-building drum so that the stitchers will stitch the fabric layers thereof together.

The control drum 3 is driven through the following mechanism from the operational shaft 1. Bevel gears 23 and 24, secured respectively to the shafts 1 and 25, respectively, impart a rotation to the shaft 25 when the shaft 1 is driven. The control shaft 2 is driven from the shaft 25 through the intermediacy of two sets of gears, only one set of which can operate at a time. One set of gears is made up of the spur gear 26 on the shaft 25 and a spur gear 27 freely rotatable on the shaft 2 when rotated in one direction but which drives the shaft 2 through the intermediacy of a one-way clutch 28 when rotated in the opposite direction to that indicated by the arrow. Such one-way clutches are well known in the art and need no further description. The other set of gears 29 and 30 have an idler gear 21 interposed therebetween. The gears 29 and 30 are mounted similarly to the gears 27 and 26, and operate in a similar manner. The gear 30 drives the shaft 2 through a one-way clutch 32. The one-way clutches 28 and 32 are so constructed that both will drive the shaft 2 in the same direction when these clutches are rotated in the direction in which the clutches become operative but neither of these clutches will drive the shaft in the opposite direction. When the shaft 25 is rotated, gears 27 and 30 are rotated in opposite directions with respect to each other, whereby only one of the clutches 28 or 32 is, at any given time, operative. If the direction of movement of the shaft 25 is reversed, then the shaft 2 is driven by the other of the clutches. Thus, regardless of which direction the shaft 25 is turned, the shaft 2 will always turn in the same direction. Therefore, since the shaft 1 drives the shaft 25, a reversal of movement of the shaft 1 will not affect the direction in which the shaft 2 is driven.

Let it be assumed that the operational shaft 1 is driven by the motor 16 first in one direction and then in the other to cause a cycle of operation for the stitchers. During this cycle, the drum 3 is rotated always in the same direction so that the various cams operate the respective micro-switches which control certain other functions of the apparatus to be described later. The apparatus is then ready to complete another cycle of operation. If the stitchers have not returned to precisely the same point at which they started, the small amount of error in their position which might be caused by overrunning or lagging of the motor after the current is cut off, will not be sufficient to cause a material error in the functioning of the stitchers on the next cycle. However, this error will tend to accumulate and eventually the initial starting position of the stitchers will be so far away from that desired that it will be detrimental to the operation of the machine. This invention therefore contemplates resetting the stitchers at their initial position after each cycle, thus eliminating after each cycle any material error in the position of the stitchers or the accumulation of small errors. It also is a purpose of this invention to relocate the control drum 3 at an initial position so that on the next cycle of operation the error that may have crept into the first cycle will be eliminated.

Before describing the electrical mechanism for controlling the apparatus the general operation of the resetting mechanism will be described.

The shaft 25 is in reality a two-part shaft connected by a magnetic clutch 33 which is disengaged at the end of a cycle of operation to permit the resetting of the shaft 1 and of the control cylinder 3. As the cycle is almost completed, mechanism comes into operation for positively locating the shaft 2 in a predetermined position. A plunger 34 normally retracted by a spring 35 is actuated by a solenoid 36 against the action of the spring to move it in a downward direction against the outer face of the cam 37 and the solenoid yieldingly holds the plunger 34 against the surface of the cam until it drops down into the notch 38 to locate the shaft 2 in place. At the same time, the micro-switch 39 which abuts against the plunger 34 is opened as the plunger 34 moves out of contact therewith and this switch is in the circuit to the magnetic clutch 33 with the result that the clutch is disengaged and, even though the motor 16 may continue to operate, the shaft 2 will be located in a fixed position ready for the next cycle of operation. The shaft 2 also carries a pulley 40 over which is trained a rope 41 fastened at 42 to a fixed support and carrying a weight 43 at the free end thereof. The weight 43 provides a friction retarding means for the shaft 2, whereby as soon as the magnetic clutch is disengaged, the shaft will stop without over-running.

At approximately the same time that the plunger 34 moves downwardly, a cam on the control drum 3 operates a switch to cut off the motor 16 so that the operational shaft also will be stopped. However, in view of the fact that the shaft 1 will not always stop in the same position, it is necessary to provide means for resetting the shaft 1 at a predetermined initial position. This is accomplished by means of a cam 44 on the end of the shaft 1 and two micro-switches 45 and 46 in the electrical circuit which close the motor circuit to rotate the motor 16 in one direction or the other, depending upon which of these switches is closed. Normally, however, these switches cannot energize the circuit to operate the motor but only come into operation at the end of the cycle and after the power to the motor 16 has been cut off.

Let us assume that when the power to the motor 16 is cut off, the shaft 1, instead of being in the desired position shown in Fig. 3, has moved to a position slightly counter-clockwise to the position shown in Fig. 3. This causes the roller on the end of the arm of the micro-switch 45 to ride onto the cam surface 47, thus closing the circuit to the motor which will drive the motor in a direction to operate the shaft 1 in a clockwise direction. Then, as the roller of the micro-switch 45 moves off the cam surface 47, the power to the motor is cut off and the cam will be reset in the desired initial position. Similarly, the cam 46 will reset the shaft if, after the initial stopping of the motor, the shaft has moved too far in a clockwise direction.

Thus, it will be seen that, after the power to the motor is cut off, the control drum 3 and the operational shaft 1 are completely cut off from driving relation with each other and are reset in their initial starting positions. As soon as the next cycle is begun by closing a manual control switch to the motor 16, the solenoid 36 which operates the plunger 34 is de-energized and, as the plunger moves upward, the micro-switch 39 is closed, causing the re-engagement of the magnetic clutch 33 to once again establish driving connection between the operational shaft 1 and the control shaft 2; the micro-switches 45 and 46 are de-energized and the operational shaft and control shaft move in unison.

In Fig. 4 there is shown the wiring diagram used in connection with the apparatus just described and, in order to avoid confusion in Figs. 1, 2 and 3 by showing a great many wire connections between the different parts, I have illustrated by dotted lines in Figs. 1, 2 and 3 the various connections from the micro-switches to the various parts which they control. In Fig. 4 similar reference characters refer to similar parts in Figs. 1, 2 and 3.

The main power line is illustrated by the wires 48 and 49 connected to a suitable source of electrical energy. The reference numeral 50 indicates the circuit used for connecting the source of electrical energy with the forward windings of the motor 16; 51 similarly indicates the circuit for the reversed windings; 52 represents the circuit for operating the solenoid 36; 53 represents the circuit to the micro-switches 45 and 46 in the resetting mechanism; 54 is the circuit to the magnetic clutch; 55 represents the starting circuit for the motor; 56 and 57 represent, respectively, the forward and reverse windings of the motor; and 58 represents the electrical interlock in the motor which prevents current flowing to both the forward and reverse windings at the same time. In fact, if the current is flowing to the forward windings and the switch for turning on the current to the reverse windings is closed, no current will flow to the reverse windings until the switch opens the circuit to the forward windings. Such an interlock is well understood in the art and no description thereof is believed to be necessary.

The operations of the device is as follows:

Let us assume that the parts are in the position shown in Fig. 1 with one exception, namely, that the plunger 34 is engaged in the notch 38 of the cam 37. This is the position which it will occupy before the start of the cycle. Also, at this stage the magnetic clutch 33 is disengaged and must be engaged before the motor starts to rotate, as otherwise the shaft 1 and the shaft 2 will be thrown out of synchronism. For this purpose, in actual practice provision will be made for a delayed action release for starting the motor after the starting button is operated in order to insure that the plunger 34 is disengaged from the notch 38 and that the magnetic clutch is engaged before the motor is started. In the drawings I have shown the starting button at 59 and another button at 60 operated by the starting button 59. The button 60 will be in reality a delayed action switch so that upon pressing the button 59 the switch 60 is operated, but before the circuit 55 is closed sufficient time will have elapsed to permit disengagement of the plunger 34 and engagement of the magnetic clutch 33.

The operator presses on the button 59 which, as already explained, operates the delayed action switch 60. As soon as the switch 59 is open the coil 36 becomes de-energized even though the micro-switch 13 remains closed, with the result that the plunger 34 is retracted by the spring 35. This, in turn, operates the micro-switch 39 to close the circuit to the magnetc clutch 33 to cause the engagement of the magnetic clutch, thus coupling the shaft 1 and 2 together with a positive drive through the intermediate gearing. By this time the delayed action switch 60 causes a closing of the circuit 55, thus operating the forward windings 56 of the motor to drive the shaft 1 and, as a result, the shaft 4 and drum 3 are rotated to cause movement of the drum in the direction shown by the arrow thereon. As soon as the drum has moved a slight distance the micro-switches 13 and 14 ride off the ends of their respective cams 9 and 10, thus opening the switches 13 and 14 and rendering them inoperative until close to the end of the cycle. Shortly after the drum starts to rotate, the micro-switch 11 engages the cam 7 which then holds the switch closed and this closes the circuit 50 to the forward windings 56 so that the starting button can be retracted, closing the circuit 52 except for the switch 13 and also opening the starting circuit 55 due to the retraction of the switch 60.

The forward motion continues until the microswitch 12 strikes the cam 8. This closes the micro-switch 12 and the circuit 51 to the reverse windings of the motor. However, the motor will not reverse due to the interlock 58 until the micro-switch 11 rides off the end of the cam 7 at which time the motor reverses and, consequently, the shaft 1 reverses its motion. However, due to the gearing 26, 27, 28, 29, 30, 31 and 32 previously described, the shaft 2 will continue to turn in the same direction to effect rotation of the drum 3.

Further rotation of the drum 3 causes the lock-on switch 13 to engage the cam 9, thus closing the circuit to the solenoid 36, causing the plunger 34 to engage the surface of the cam 37 and, on continued rotation of the cam, to engage in the notch 38 when it registers therewith. This movement of the plunger 34 opens the micro-switch 39, causing disengagement of the clutch 33 so that the shaft 1 and the shaft 2 are now disconnected and should be disconnected because the shaft 1 is still being driven by the motor 16. The shaft 2, however, is locked in position ready for the next operation. Actually, by the time the plunger 34 has engaged within the notch 38, the drum has rotated sufficiently to bring the cam 10 into engagement with the reset switch 14, but this happens only at the very extreme end of the cycle. It will normally be adjusted so that the reset mechanism will not come into operation until the shaft 1 is within less than about 180° of its desired final position and preferably within about 5° or less. At the same time that the reset mechanism becomes operative, the micro-switch 12 is opened by its riding off the end of the cam 8, thus stopping the motor. However, the reset mechanism, including the micro-switches 14, 45 and 46, are in position to operate the motor providing the shaft is not in its proper angular position as previously described. The micro-switch 14 is closed by the cam 10 and if the micro-switch 45 or the micro-switch 46 rides on the cam surface 47, depending on the direction that the shaft is out of position, the forward or reverse windings of the motor will be connected to cause the motor to operate the shaft 1 until both micro-switches ride off the cam 47 in the positions indicated in Fig. 3.

Thus it will be seen that after the cycle of operation takes place, the shaft 2 is located in a fixed position so as to start from that fixed position at the beginning of the next cycle. Similarly, the shaft 1 is also definitely located in a fixed position. The two shafts are then ready to be connected by the magnetic clutch 33 and the next cycle of operation can take place. While there may be a small error in the initial or final positions of the respective parts, the error does not accumulate and a small amount of error in the positions of the parts is not material. It is only when the cumulative error is substantial that the machine ceases to function properly.

Thus it will be seen that there is provided an operational shaft 2 connected to the control shaft which has to be in synchronism therewith and two clutches drive the control shaft in the same direction regardless of the direction of rotation of the operational shaft. Also, these shafts are wholly disconnected from each other so as to permit resetting of the positions of these shafts in an initial position after each cycle of operation or, if desired, after a predetermined number of cycles of operation to eliminate any accumulating error. Such arrangement as has been described not only does away with the necessity of returning the control drum to an initial position for the next cycle of operation, but it also permits the use of several sets of cams for successive cycles. The second cycle may be a little different from the first or it may be a duplicate thereof.

It must also be borne in mind that while I have shown only four micro-switches, 11, 12, 13 and 14, operated by suitable cams on the drum 3, in actual practice the number of these micro-switches may be considerably higher and in most cases is higher. For example, with the stitcher mechanisms herein shown merely by way of example, it is possible to use another micro-switch and cam combination which, at a certain point in the movement of the stitchers, will increase the pressure being exerted by the stitchers on the tire or another micro-switch and cam could be used to control the speed of the motor at various points in the cycle, etc. Also, the same cam may be used to control the speed of the motor at various points in the cycle, etc. Also, the same cam may be used to control other mechanisms in the machine under consideration.

Various changes can be made in the arrangement and construction of the parts without departing from the spirit of the invention and, therefore, I do not wish to be limited except as set forth in the claims hereunto appended.

Having thus fully described my invention, what I claim and desire to secure by Letters Patent of the United States is:

1. In an apparatus of the class described, the combination with an operational shaft, power means for rotating said shaft in opposite directions, means operated by said shaft through a cycle of operations controlling the actuation of said power means, control means to start and stop the rotation of said shaft at the end of the cycle, and resetting means operable upon the completion of the cycle to locate said operational shaft always in substantially the same initial position with reference to the means which it operates, whereby the cycle of operations will always be started substantially from the same point, said resetting means comprising means on said shaft for rendering said power means operative to rotate said shaft to its initial position if the shaft is not at said initial position at the end of the cycle.

2. In an apparatus of the class described, the combination with an operational shaft, power means for rotating said shaft in opposite directions, means operated by said shaft through a cycle of operations controlling the actuation of said power means, control means to start and stop the rotation of said shaft at the end of the cycle, and resetting means operable upon the completion of the cycle to locate said operational shaft always in substantially the same initial position with reference to the means which it operates, whereby the cycle of operations will be started substantially from the same point, said resetting means being separate from said control means and comprising means on said shaft for operating said power means to move said shaft in a direction toward said initial position if and when the control means becomes inoperative and the shaft is not then in the initial position.

3. A device as set forth in claim 2 in which the cycle of operations for the shaft is controlled by means on a rotating drum driven from said operating shaft and which also includes mechanism for locating the drum in its intended initial position at the end of a cycle of operations for said shaft, and means for disconnecting said drum from said shaft when said drum is in the locating position, whereby said shaft may then be rotated independently of said drum into substantially the desired initial position by resetting means.

4. Means for actuating and for controlling the initial setting of an operational shaft which comprises power means for rotating said shaft, means for stopping the rotation of said shaft and means operable near the end of the rotation of said shaft for locating the shaft always in substantially the same initial starting position, comprising a cam for said shaft having at least two circumferential cam surfaces, two separate control means for actuating said power means each in an opposite direction and so located with respect to said cam that they are inoperative when the shaft is at the desired initial position, but are operable by their respective cam surfaces to actuate said power means to move said shaft to said initial position if and when said shaft is other than at said initial position.

5. In a control mechanism for positioning an operational shaft always at substantially the same initial position in a cycle of operations, the combination with an operational shaft, of work means driven by said shaft, power means for driving said shaft in opposite directions, means for rendering said power means operative at the end of said cycle, resetting means operable only at the end of the cycle for rendering said power means operative to rotate said shaft in a direction to move it to substantially its desired initial position if and when said shaft stops at other than at that position, and means on said shaft for rendering said resetting means operative only if said shaft stops at other than said initial position.

6. In a device of the class described, the combination with an operational shaft of a reversible electric motor for driving said shaft, work means operated by said shaft, an electrical circuit for operating said motor in either direction, a control drum, means in said circuit and on said drum for causing operation of said motor in one direction or the other to drive said shaft selectively in opposite directions, means for driving said drum from said shaft including gearing for always driving said drum in the same direction regardless of the direction of rotation of said shaft and including also a clutch automatically disengageable at the end of a cycle of operation for wholly separating the drive from said shaft to said control drum to permit resetting of the shaft and drum independently of each other, and means for resetting said shaft and drum while the two are disconnected.

7. A device as set forth in claim 6 in which the means for driving the drum always in the same direction comprises two clutches driven by said shaft, one of which actuates said drum when the shaft is driven in one direction and the other of which is operative to drive the shaft in the same direction when the shaft is driven in the opposite direction.

8. In a device of the class described, the combination with a motor, electrical means for driving said motor including a forward circuit and a reverse circuit, a rotatable control drum, separate circuit actuating means for each of said circuits, control means on said drum for rendering said actuating means for said circuits operable at different times, an operational shaft driven by said motor, means for driving said drum from said shaft always in the same direction irrespective of the direction of rotation of the shaft, means for disconnecting said shaft from said drum, means operable after disconnection of said shaft and drum for locating and locking said drum in a desired starting position, means for resetting the shaft while said shaft and drum are disconnected, including cams on said shaft, electrical circuits controlled by each of said shafts for actuating said motor in forward and reverse directions, said cams being adapted to render their respective circuits operable if and when said shaft is not at its desired position when disconnected from said drum, whereby said motor will be actuated in the desired direction to position the shaft in the desired initial position, brake means for slowing down rotation of the drum when it is freed from its connection with the shaft and means for rendering said resetting and locking means temporarily inoperable upon the initiation and throughout the next cycle of operation.

9. A mechanism of the class described comprising an operational shaft, power means for actuating said shaft means for operating said power means to drive said shaft in one direction, means for operating said power means to drive the shaft in the opposite direction, a control drum having means thereon for actuating both of said last mentioned means to render said power means operative to drive said shaft selectively in one direction or the other as said drum rotates, driving means connecting said drum with said shaft to drive said drum from said shaft upon rotation of said shaft, said driving means including gearing to drive said drum always in the same direction regardless of the direction of rotation of said operational shaft, clutch means, and means for engaging and disengaging said shaft and drum at the beginning and end of said cycle respectively, means operatively connected to and controlled by said shaft for automatically rotating said shaft in a direction to bring it to its correct initial position for the beginning of the cycle if the shaft is not in that position when said clutch means is disengaged at the end of the cycle.

10. An apparatus of the class described, including work means constructed to operate in a given cycle, a control including power means for moving said work means through said cycle, a second control means for rendering said power means operative at the beginning of the cycle to drive said work means through said cycle and for rendering said power means inoperative at the end of the cycle, and resetting means operable at the end of the cycle for moving the work means always into substantially the same initial starting position, whereby the cycle will always be started from substantially the same position, said resetting means comprising means on said shaft for rendering said power means operative to rotate said shaft to its initial position.

11. A device as set forth in claim 10 in which means is provided to lock said first control means in a predetermined initial position at the end of said cycle when said power means becomes inoperative, and in which there is means to disconnect the first control means from said resetting means while said work means is being reset at said initial position by said resetting means.

12. Means for actuating and for controlling the initial setting of an operational shaft which comprises power means for rotating said shaft, means for stopping the rotation of said shaft, resetting means controlled by means on said shaft and operable near the end of the period of rotation of said shaft for driving the shaft in a direction to bring it to its initial position, and means for rendering said resetting means inoperative when said shaft is at said initial position.

JORGEN I. HAASE.

REFERENCES CITED

The following references are of record in the file of this patent:

UNITED STATES PATENTS

| Number | Name | Date |
|---|---|---|
| 1,001,339 | Binder | Aug. 22, 1911 |
| 1,584,703 | Penney | May 11, 1926 |
| 1,950,692 | Owens | Mar. 13, 1934 |
| 2,005,663 | Phily | June 18, 1935 |
| 2,331,354 | Stout | Oct. 12, 1943 |
| 2,384,996 | Hanson | Sept. 18, 1945 |
| 2,395,636 | Mettert | Feb. 26, 1946 |
| 2,428,828 | Berge | Oct. 14, 1947 |